United States Patent
Todd et al.

(10) Patent No.: US 10,721,261 B1
(45) Date of Patent: Jul. 21, 2020

(54) DATA GOVERNANCE WITH AUTOMATED RISK VALUATION VIA IMPACT PER EVENT ANALYTICS

(71) Applicant: EMC IP Holding Company LLC, Hopkinton, MA (US)

(72) Inventors: Stephen Todd, Shrewsbury, MA (US); Barbara Latulippe, Bradford, MA (US); Anand Singh, Westborough, MA (US); Sudhir Vijendra, Westborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 173 days.

(21) Appl. No.: 15/484,270

(22) Filed: Apr. 11, 2017

(51) Int. Cl.
 *H04L 29/06* (2006.01)
(52) U.S. Cl.
 CPC ...... *H04L 63/1433* (2013.01); *H04L 63/1425* (2013.01)
(58) Field of Classification Search
 CPC .................. H04L 63/1433; H04L 63/1425
 See application file for complete search history.

(56) References Cited

U.S. PATENT DOCUMENTS

| | | | | |
|---|---|---|---|---|
| 2015/0248679 A1* | 9/2015 | Subudhi | ............ | G06Q 30/0202 705/7.31 |
| 2015/0326601 A1* | 11/2015 | Grondin | ............. | G06Q 10/0635 726/25 |
| 2015/0381649 A1* | 12/2015 | Schultz | ............... | H04L 63/1433 726/25 |
| 2016/0197935 A1* | 7/2016 | Jamison | ................ | H04L 63/105 726/27 |

OTHER PUBLICATIONS

U.S. Appl. No. 15/268,046 filed in the name of Stephen Gatchell et al. filed Sep. 16, 2016 and entitled "Hierarchical Value-Based Governance Architecture for Enterprise Data Assets."
U.S. Appl. No. 15/359,916 filed in the name of Stephen Todd et al. filed Nov. 23, 2016 and entitled "Automated Identification and Classification of Critical Data Elements."

* cited by examiner

*Primary Examiner* — Joseph P Hirl
*Assistant Examiner* — Ka Shan Choy
(74) *Attorney, Agent, or Firm* — Ryan, Mason & Lewis, LLP

(57) ABSTRACT

A data governance method comprises the following steps. One or more data elements associated with an enterprise are identified as one or more critical data elements. A data structure is maintained for the one or more critical data elements. For a given critical data element, the data structure stores information that reflects an impact that the given critical data element had on at least one event associated with the enterprise. The method predicts a risk associated with a subsequent impact that the given critical data element may have on at least one subsequent event associated with the enterprise, wherein the risk of the subsequent impact is predicted using at least a portion of the information stored in the data structure.

20 Claims, 9 Drawing Sheets

| IDF | Business Processes Impacted | Historical Business Impact(s) | Proactive Cost Calculation Intakes | Analytic Calculator(s) |
|---|---|---|---|---|
| Country_Code | Shipping | $xx | Historical_Fines, Vendor.Fee | ShippingHoldScript() |
| | Support | $yy | | |
| | CSAT | $zz | Historical_CSAT, Customer.open_cases | CSATScript() |
| | Revenue | $xy | Historical_Sales, Forecasts | SalesForecastScript() |
| | Engineering | $xz | | |

FIG. 2

| Data Element | Critical? | Value | Rationale |
|---|---|---|---|
| Source3 | Yes | 13 | End User + All Nodes > 10 |

DATA GOVERNANCE WITH AUTOMATED RISK VALUATION VIA IMPACT PER EVENT ANALYTICS

FIELD

The field relates generally to information processing systems, and more particularly to techniques for implementing data governance in information processing systems.

BACKGROUND

Enterprises have become increasingly reliant on data, whether it be for the creation of data products, the creation of data services, or the reliance on data to make critical decisions for the enterprise. It is also known that enterprises use many different types of information processing systems configured to incorporate many different types of data analytics functionalities. However, issues can arise in some of these systems relating to governance of data from data sources within a given enterprise. For example, the issue of poor data quality can have a negative impact on a given enterprise, particularly due to the fact that poor data quality is often detected after the fact, i.e., after the negative impact is realized. Depending on the nature of the data quality issue, the negative impact can be significant for the enterprise.

SUMMARY

Embodiments of the invention provide data governance techniques implemented in information processing systems configured to perform automated risk valuation via impact per event analytics.

For example, in one embodiment, a method comprises the following steps. One or more data elements associated with an enterprise are identified as one or more critical data elements. A data structure is maintained for the one or more critical data elements. For a given critical data element, the data structure stores information that reflects an impact that the given critical data element had on at least one event associated with the enterprise. The method predicts a risk associated with a subsequent impact that the given critical data element may have on at least one subsequent event associated with the enterprise, wherein the risk of the subsequent impact is predicted using at least a portion of the information stored in the data structure.

Advantageously, illustrative embodiments provide data governance techniques that provide an enterprise with a risk valuation associated with a given critical data element. Since the risk valuation is predictive in nature, the enterprise can correct an issue with the critical data element before the impact is realized. For example, illustrative embodiments automatically identify critical data elements and maintain a data structure (e.g., a cost per event matrix) that enables the enterprise to be made aware of a risk or potential loss to the enterprise.

These and other illustrative embodiments include, without limitation, methods, apparatus, systems, and computer program products comprising processor-readable storage media.

BRIEF DESCRIPTION OF THE DRAWINGS

FIG. 2 illustrates an example of a data structure for use in a risk valuation-based data governance architecture, according to an embodiment of the invention.

FIG. 4 illustrates a critical data element rationale table, according to an embodiment of the invention.

DETAILED DESCRIPTION

Figure 1:
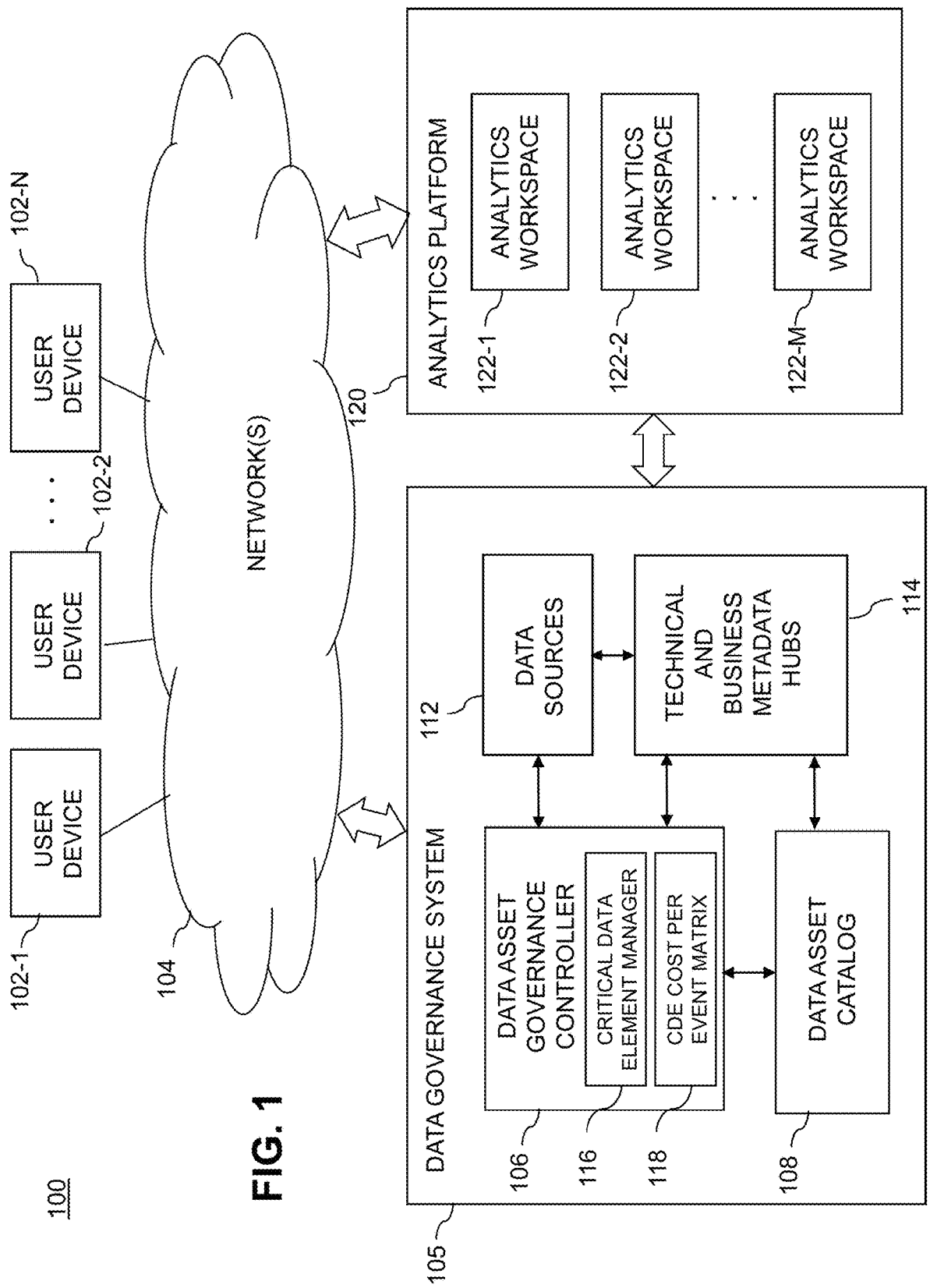
FIG. 1 illustrates an information processing system implementing a risk valuation-based data governance architecture, according to an embodiment of the invention.

Illustrative embodiments of the present invention will be described herein with reference to exemplary information processing systems and associated computers, servers, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, a plurality of data centers each comprising one or more clouds hosting multiple tenants that share cloud resources.

Many enterprises create and maintain information processing systems in the form of a business data lake (BDL) which serves as a centralized data location for storing, sharing, collaborating and analyzing data sets associated with the enterprise. Recent advancements in the data management industry have seen the rise of governance frameworks that reside functionally alongside data lakes. These governance frameworks contain BDL metadata that enables many functions, such as attempting to reduce business risk (e.g., avoiding data cleanup costs of incorrect customer addresses) and/or enable data monetization (e.g., realizing revenue as products ship on-time to the correct customer address).

One example of such a data governance framework is described in U.S. Ser. No. 15/268,046, filed on Sep. 16, 2016 and entitled "Hierarchical Value-Based Governance Architecture for Enterprise Data Assets," the disclosure of which is incorporated by reference herein in its entirety.

Some governance approaches automatically identify, prioritize and classify critical data elements, e.g., U.S. Ser. No. 15/359,916, filed on Nov. 23, 2016 and entitled "Automated Identification and Classification of Critical Data Elements," the disclosure of which is incorporated by reference herein in its entirety.

As illustratively used herein, a "critical data element" (CDE) is a data element that is or could be critical to an enterprise. What is "critical" to an enterprise depends on the nature of the enterprise, and can be specifically defined by a given enterprise. A CDE for an enterprise may be a data element that is important to the enterprise because some condition attributable to the data element can have an appreciable consequence (impact) on the enterprise. By way of non-limiting example, a CDE can be a data element that represents a potential risk to the enterprise (e.g., due to the fact that the data quality is low) and/or a potential lost opportunity to the enterprise (e.g., due to the fact that the importance of the data to the enterprise goes undetected).

As will be explained in detail herein, embodiments of the invention provide automated techniques for identifying CDEs, maintaining a data structure for the CDEs, wherein for a given CDE, the data structure stores information that reflects an impact that the given CDE had on at least one event associated with the enterprise, and predicting a risk associated with a subsequent impact that the given CDE may have on at least one subsequent event associated with the enterprise, wherein the risk of the subsequent impact is predicted using at least a portion of the information stored in the data structure.

It is to be understood that a "data element" may be one or more data items, units, objects, sets, fields (e.g., a column name), or combinations thereof, that are part of the data assets of a given enterprise.

FIG. 1 shows an information processing system 100 configured in accordance with an illustrative embodiment of the present invention. The information processing system 100 is assumed to be built on at least one processing platform and provides data governance functionality for data assets of an enterprise. The information processing system 100 of FIG. 1 may employ one or more features of the data governance architectures of the above-referenced U.S. Ser. Nos. 15/268,046 and 15/359,916. However, it is to be understood that automated CDE management embodiments of the invention are not limited to implementation within any particular data governance architecture. Thus, the implementation of automated risk valuation-based data governance, according to embodiments of the invention, may operate within a system architecture such as the one illustrated in FIG. 1, within another system architecture different than the one illustrated in FIG. 1, outside such a system architecture as a standalone function, or some combination thereof.

In this embodiment, the system 100 more particularly comprises a plurality of user devices 102-1, 102-2, . . . 102-N coupled to a network 104. Also coupled to the network 104 is a data governance system 105. The data governance system 105 comprises a data asset governance controller 106, a data asset catalog 108, data sources 112, and technical and business metadata hubs 114. The data asset governance controller 106 also comprises a critical data element (CDE) manager 116 and a CDE cost per event matrix 118, as will be further explained below. The data asset catalog 108 interacts with the technical and business metadata hubs 114 in order to provide integrated technical metadata and business metadata for each of a plurality of the data assets of the enterprise. The data governance system 105 is accessible to the user devices 102 over the network 104.

The term "enterprise" as used herein is intended to be broadly construed, and may comprise, for example, a business or other type of organization that performs analytics utilizing data assets.

At least a subset of the data assets of the enterprise comprise data ingested into at least one data lake of the enterprise. A given such data lake in some embodiments comprises a BDL.

The term "data lake" as utilized herein is intended to be broadly construed so as to encompass, for example, a data repository that stores data without optimization for particular predetermined types of analysis or other processing. For example, a data lake can be configured to store data in a manner that facilitates flexible and efficient utilization of the stored data to support processing tasks that may be at least partially unknown or otherwise undefined at the time of data storage. This is in contrast to so-called data warehouses or data marts, which generally store data in accordance with particular predefined sets of data attributes or with predetermined data interrelationships.

Moreover, a data lake in some embodiments can provide the ability to deal with flexible combinations of a wide variety of different types of data in different analytics contexts. Examples of analytics contexts that may be supported by one or more analytics platforms in illustrative embodiments include financial services, telecommunications, health care, life sciences, manufacturing, energy, transportation, entertainment, data center security, sensor data processing and numerous others.

Data lakes in some embodiments provide the ability for the users to store different types of data in various data containers of their choosing. The data containers may be provided in multiple types, formats and storage capabilities. A given data scientist or other user may prefer to utilize one type of data container over another based on familiarity, standards, type of analytics, type of models and processing capabilities.

Also accessible to the user devices 102 over the network 104 is an analytics platform 120 that includes a plurality of analytics workspaces 122-1, 122-2, . . . 122-M. The analytics platform 120 is directly coupled to the data governance system 105 but can additionally or alternatively communicate with the system 105 over the network 104.

The data asset governance controller 106 is configured to generate analytics actions for one or more of the analytics workspaces 122 based at least in part on the integrated technical metadata and business metadata of the data asset catalog 108. The analytics actions generated by the data asset governance controller 106 illustratively comprise one or more visualizations providing actionable insights into the corresponding data assets.

The CDE manager 116 of the data asset governance controller 106 is configured to automatically identify data elements that are considered critical to an enterprise, i.e., critical data elements or CDEs. As will be further explained below, CDEs are measured by the CDE manager 116 against defined data quality metrics and/or key performance indicators (KPIs). Use of such metrics and indicators minimizes the risk of the data element to the enterprise, and can also increase the opportunity for monetization or other forms of value. For example, in one or more illustrative embodiments, the CDE manager 116 automatically identifies CDEs, and prioritizes and classifies their level of criticality, while also attaching a standardized CDE rationale for the benefit of the enterprise. As a result of this automation, business processes are then created which minimize the risk represented by the CDE and/or maximize the value that can be returned from the CDE. In other embodiments, CDEs can be manually identified by enterprise personnel (e.g., data scientists, data stewards, and subject matter experts or SMEs) and inputted to the CDE manager 116.

It is to be appreciated that although the analytics workspaces 122 in this embodiment are implemented in an analytics platform 120 that is separate from the data governance system 105. Other embodiments can incorporate at least a portion of one or more of the analytics workspaces 122 into the data governance system 105. In addition, although only a single analytics platform 120 is shown in the FIG. 1 embodiment, other embodiments can include multiple analytics platforms each comprising at least one analytics workspace.

The user devices 102 can comprise, for example, desktop, laptop or tablet computers, mobile telephones, or other types of processing devices capable of communicating with at least one of the data governance system 105 and the analytics platform 120 over the network 104.

The "users" in a given embodiment may refer, for example, to respective ones of the user devices 102, although the term "user" as utilized herein is intended to be broadly construed so as to encompass numerous other arrangements of human, hardware, software or firmware entities, as well as combinations of such entities. Accordingly, a user may be a human user, or a software entity such as an application, or any of a wide variety of other entity arrangements.

The network 104 may comprise any type of network, including by way of example a global computer network such as the Internet, a wide area network (WAN), a local area network (LAN), a satellite network, a telephone or cable network, a cellular network, a wireless network such as a WiFi or WiMAX network, or various portions or combinations of these and other types of networks.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

In some embodiments, the technical metadata hub is coupled to the business metadata hub via an integration interface providing access to one or more query application programming interfaces (APIs) of the technical metadata hub.

The technical metadata hub of the set of metadata hubs 114 illustratively comprises a technical metadata store, and the business metadata hub of the set of metadata hubs 114 illustratively comprises a business metadata store. The term "metadata store" in this context refers to at least a portion of a storage system configured to store particular types of metadata. At least portions of the technical metadata are obtained by automated scanning of the data assets of the enterprise. The technical metadata for a given one of the data assets of the enterprise illustratively comprises physical attributes of the given data asset including location, creator, lineage and contents of the given data asset.

At least portions of the business metadata are based at least in part on value-based data asset assessments received from corresponding data asset users associated with respective ones of the user devices 102 via at least one user interface of the business metadata hub. The business metadata for a given one of the data assets illustratively comprises semantic and logical attributes of the given data asset including business definition, usage details, business controls and business owner of the given data asset.

The data governance system 105 in the present embodiment is assumed to comprise a multi-level hierarchical architecture having at a lower level of the hierarchical architecture an ingestion level configured to ingest data assets into at least one data lake from data sources 112 of the enterprise and at an upper level of the hierarchical architecture an action level configured to generate the above-noted analytics actions for one or more of the analytics workspaces 122.

The integrated technical metadata and business metadata for a given one of the data assets of the enterprise illustratively provides traceability of the given data asset through the multiple levels of a hierarchical architecture of the data governance system 105 from a corresponding analytics action at an upper one of the levels back to its data source at a lower one of the levels.

A multi-level hierarchical architecture in some embodiments may further comprise one or more intermediate levels including at least one of a function generation level and an analytical results model level. For example, the analytical results model level is illustratively configured to facilitate utilization of the data assets in the analytics workspaces by providing at least one of verification and trust assurance for the data assets in accordance with at least one analytical results model.

The analytics platform 120 may comprise a distributed analytics platform comprising multiple interconnected processing nodes. For example, a given analytics platform in some embodiments is implemented using a plurality of distributed processing nodes, illustratively comprising cloud compute nodes and cloud storage nodes of cloud infrastructure, although numerous other arrangements are possible.

As a more particular example, an illustrative distributed implementation of the analytics platform 120 in one embodiment is configured to perform analytics operations in accordance with a processing framework supported by an Apache Hadoop YARN ("Yet Another Resource Negotiator") or Hadoop 2.0 cluster. Examples of frameworks supported by the Hadoop YARN platform include MapReduce, Spark, Hive, MPI and numerous others.

In some embodiments, a plurality of processing nodes collectively implement at least a portion of a distributed analytics platform that is more particularly in the form of a multi-cluster distributed data processing platform. Such a platform may comprise, for example, a plurality of potentially geographically-distributed YARN clusters each comprising a corresponding cluster of distributed processing nodes.

The data governance system 105 of information processing system 100 is illustratively configured to provide an information marketplace framework for managing the data assets of an enterprise in a manner that facilitates the extraction of useful and otherwise actionable insights from the data assets while also implementing agile controls for development utilization. For example, integrating technical metadata obtained by automated scanning with business metadata provides end-to-end traceability from a visualization at a high level of a hierarchical (value-based) governance architecture to corresponding data sources at a low level of the architecture. Such arrangements provide valuable tools to data analysts, data scientists, data stewards and other users, facilitating information discovery, consumption, insight and collaboration, leading to enhanced monetization of data assets for the enterprise. Accordingly, an enterprise can more readily focus their governance resources on data assets which have high value, are scalable to accelerate growth, can improve product reliability or can be used to recommend customer prescriptive actions.

In some embodiments, data governance is implemented by the data asset governance controller 106 in accordance with an agile model which provides an appropriate level of governance as defined by a stakeholder community and value-based consumption to the enterprise. The data governance system 105 recognizes that not all data is of equal value and therefore allows the stakeholder community to determine data value, consumption utilization and data sharing parameters. For example, this paradigm can shift data governance for a given enterprise from an internal focus to a focus on what is relevant to govern based on an external customer experience.

The data asset catalog 108 is illustratively configured to ensure that data assets can be easily searched and consumed utilizing robust metadata models that clearly describe and classify the data assets, thereby enabling self-service discovery of critical data assets by data analysts, data scientists, data stewards and other users, as well as by the CDE manager 116.

Governance workflows and processes generated within the data governance system 105 provide numerous advantages within the enterprise. For example, such workflows and processes address the challenges faced by data teams in terms of obtaining efficient peer-to-peer access to data assets, onboarding new data assets, obtaining support for new business value cases, promoting data assets to enterprise supported solutions, and understanding data asset corporate policies.

Additionally or alternatively, one or more illustrative embodiments are advantageously configured to realize actionable monetization with visibility to business value cases, to enable data sharing and reuse through analytical models, to provide rapid search capabilities by cataloging asset artifacts and attributes, to accelerate information insight by implementing a business context view in terms that are meaningful to business customers, to verify quality and traceability by applying data quality on CDEs, to drive actionable governance with asset workflow tasks and voting, and to expose new asset creation. These and numerous other types and combinations of value-based governance functionality and features can be provided in other embodiments.

It is to be appreciated that the particular arrangement of system elements shown in FIG. 1 is presented for purposes of illustration only, and that other arrangements of additional or alternative elements can be used in other embodiments. For example, numerous alternative information processing system configurations can be used to implement value-based governance functionality for analytics workspaces of one or more analytics platforms as disclosed herein.

Additionally or alternatively, the CDE manager 116 is further configured to: identify CDE cardinality (e.g., how many higher-level entities consume the data), manage CDE cardinality thresholds and/or CDE cardinality inheritance, perform annotation of CDE criticality, flag customer-facing data elements, identify line-of-business overlap via mapping data consumers (e.g., data scientists) to their organizations, and making semantic comparisons to other known CDEs.

While the CDE manager 116 enables an enterprise to find a large number of CDEs that represent a critical data quality risk to the organization, there is currently no way to know which CDEs represent the most risk (e.g., the highest potential business damage). It is realized that calculating a specific financial risk for CDEs is problematic due to the illustrative problems described below.

The problem of pre-emptively predicting the potential damage caused by data quality within a CDE is best described by a real-world example. This example will also be used to describe illustrative solutions to the problem.

Consider a data quality issue to a specific data element (e.g., "country_code") that prevented the successful shipments of products to a specific country. For example, the country_code data element (e.g., obtained from a data asset catalog 108 or data sources 112) contained a country name different than the country to which the product shipment was intended to go. Assume further that the quality issue went undetected until customers from the intended country began to call and inquire as to why they had not received shipment. Further assume that eventually the country_code quality issue was corrected, and the data quality team went about the exercise of trying to determine the financial damage.

It was further realized that the "country_code" data quality impact was felt by five different business departments/ processes within the given enterprise: shipping, support, customer satisfaction (CSAT), revenue, and engineering. Each department was asked to come up with a number assessing the impact. Some teams ran automated queries or reports to come up with their number. Others came up with a manual estimate based on internal knowledge.

This common "post-mortem" (or after-the-fact) approach highlights the following illustrative problems.

First, an enterprise or any data governance system it utilizes currently is not able to recall the post-mortem conclusions that are generated following an issue such as the country_code data quality issue example above. Nor is the enterprise or data governance system equipped to recall the methods (manual, automatic, or any combination thereof) used to generate the conclusions. Not only is there no ability to remember damage levels due to poor data quality, but there is also no way to associate the damage with a specific data element in current data governance systems. Further, even if data elements have been identified as critical, there is no query mechanism in current data governance systems to determine whether or not that CDE has previously been associated with an incident, and if so, what value was associated with it. Still further, while a static, historical view of the data risk that a CDE experienced is useful, it is realized herein that the predicted or potential risk would be more relevant. Current data governance systems have no dynamic method to calculate risk for a given CDE. Lastly, as an existing CDE becomes more and more leveraged within an entity, current data governance systems have no way of immediately estimating the risk increase associated with new forms of usage of the data element.

To overcome the above and other drawbacks associated with existing data governance systems, illustrative embodiments configure the CDE manager 116 (FIG. 1) to automatically identify data elements as CDEs. Further the CDE manager 116 can prioritize and classify the level of criticality of the CDEs, and attach a standardized CDE rationale for the benefit of the enterprise. Business processes can then be created that either minimize the risk represented by the CDE or maximize the value that can be returned from them. By "prioritize," it is illustratively meant that the data governance system 105 gives priority to actions involving CDEs over data elements that are not flagged as critical, and among data elements classified as CDEs, the system gives priority to actions involving CDEs with a higher level of criticality as compared with those with lower levels of criticality. In other embodiments, CDEs may also be manually identified by enterprise personnel and inputted to the CDE manager 116.

Furthermore, illustrative embodiments configure the CDE manager 116 to maintain the CDE cost per event matrix 118 for the CDEs, wherein for a given CDE, the matrix 118 stores information that reflects an impact that the given CDE had on at least one event associated with the enterprise. The matrix 118 is shown in the embodiment of FIG. 1 as being implemented in the data asset governance controller 106. However, in other embodiments, the matrix 118 may be stored as part of the metadata hubs 114 or in some other component of the data governance system 105. An example of at least a portion of the matrix 118 is shown in FIG. 2.

The CDE manager 116 is further configured to predict a risk associated with a subsequent impact that the given CDE may have on at least one subsequent event associated with the enterprise using at least a portion of the information stored in the matrix 118.

The matrix 118 is populated over time. Thus, the matrix 118 is dynamic in that it can functionally reside alongside a data asset lineage graph (as will be described below in the context of FIG. 3) or other type of CDE identification system, and over time, as an enterprise gains more experience in identifying CDEs and understanding the risks involved with corrupt or incorrect CDEs, the matrix 118 serves as a risk calculator to help the enterprise identify high-risk data elements.

FIG. 2 illustrates an example of a portion of a CDE cost per event matrix 200 for use in a data governance system 105 (e.g., part of CDE cost per event matrix 118 in FIG. 1). It is to be understood that, for the sake of simplicity of illustration, matrix 200 illustrates a single CDE and its corresponding fields and entries for a given event. However, over time, it is to be understood that a CDE cost per event matrix will have a plurality of CDEs, each with their own fields and entries for a given event.

In the portion of the matrix 200 shown in FIG. 2, the CDE is the country_code data element described in the above example, and the given event is a product shipment that went to the wrong destination because the country_code used for the product shipment was incorrect. It is to be understood that the country_code example is one of many CDEs that can have a significant monetary or other impact on an enterprise if the data element is of poor quality (e.g., the data element is incorrect). By way of another non-limiting example, the CDE can be a salesforce territory assignment data element, and the given event is the assignment of territories for a given sales person in the enterprise. If the data element is of poor quality, e.g., a sales person is assigned to the wrong territory resulting in two sales persons being assigned to the same territory, then this can have a significant impact on the enterprise (e.g., loss of sales in the territory that was supposed to be assigned to one of the two sales persons, but was not due to the incorrect data in this CDE).

As shown in matrix 200, for the CDE identified in the table as country_code, there are multiple columns defined as follows:

CDE 202: a critical data element that has undergone some sort of risk/cost analysis.

Business Process Impacted 204: a list of enterprise business processes that leverage this data element.

Historical Business Impact(s) 206: a previously recorded statement of the (actual or predicted) business impact (damage or benefit) recorded in the past. This can be the last known value or a time-stamped array of values. Thus, while the wrong country_code example is a negative impact, the business impact of the CDE can be positive. For example, in one embodiment, the system executes an automated script that shows how much money a particular CDE earned for the enterprise in the past.

Proactive Cost Calculation Intakes 208: the names of other fields or CDEs that were involved in the generation of historical business impact analyses.

Analytic Calculators 210: a list of analytic modules that can leverage the intakes (from column 208) to dynamically and automatically calculate business impact.

Thus, for the incorrect country_code CDE, five business processes were impacted as shown in column 204: shipping (row 212); support (row 214); customer satisfaction or CSAT (row 216); revenue (row 218); and engineering (row 220). Column 206 provides the historical cost impact (in dollars) that the incorrect country_code CDE had on each business process. Column 208 shows the data (if available) that was used to compute the impacts listed in column 206, while column 210 shows analytics used to compute the impacts. Note that three separate automated scripts were respectively run for shipping, CSAT, and revenue. It is assumed that the impacts in column 206 for support and engineering were manually computed and input to the matrix 200 since there are no automated scripts listed in column 210. Thus, for the shipping event where the country_code was incorrect, the matrix 200 reflects the impact that the CDE had on the event. From this information stored in the matrix, as will be further explained below, the CDE manager 116 can predict a risk associated with a subsequent impact that the CDE may have on a subsequent event (e.g., an incorrect country_code being used for a future shipment or some other event).

By maintaining and leveraging this type of information in a CDE cost per event matrix, the following operations can be performed by the CDE manager 116 (FIG. 1).

Pre-populating the cost per event matrix 118 can be accomplished by the CDE manager 116 using one or more techniques. In one embodiment, the CDE manager 116 may receive manual input from enterprise personnel (e.g., a data scientist, data steward, SME, etc.). In another embodiment, CDE identification and pre-population of the matrix can employ techniques using directed acyclic graphs to track data lineage (i.e., data asset lineage map) described in U.S. Ser. No. 15/359,916, filed on Nov. 23, 2016 and entitled "Automated Identification and Classification of Critical Data Elements," the disclosure of which is incorporated by reference herein in its entirety.

Figure 3:
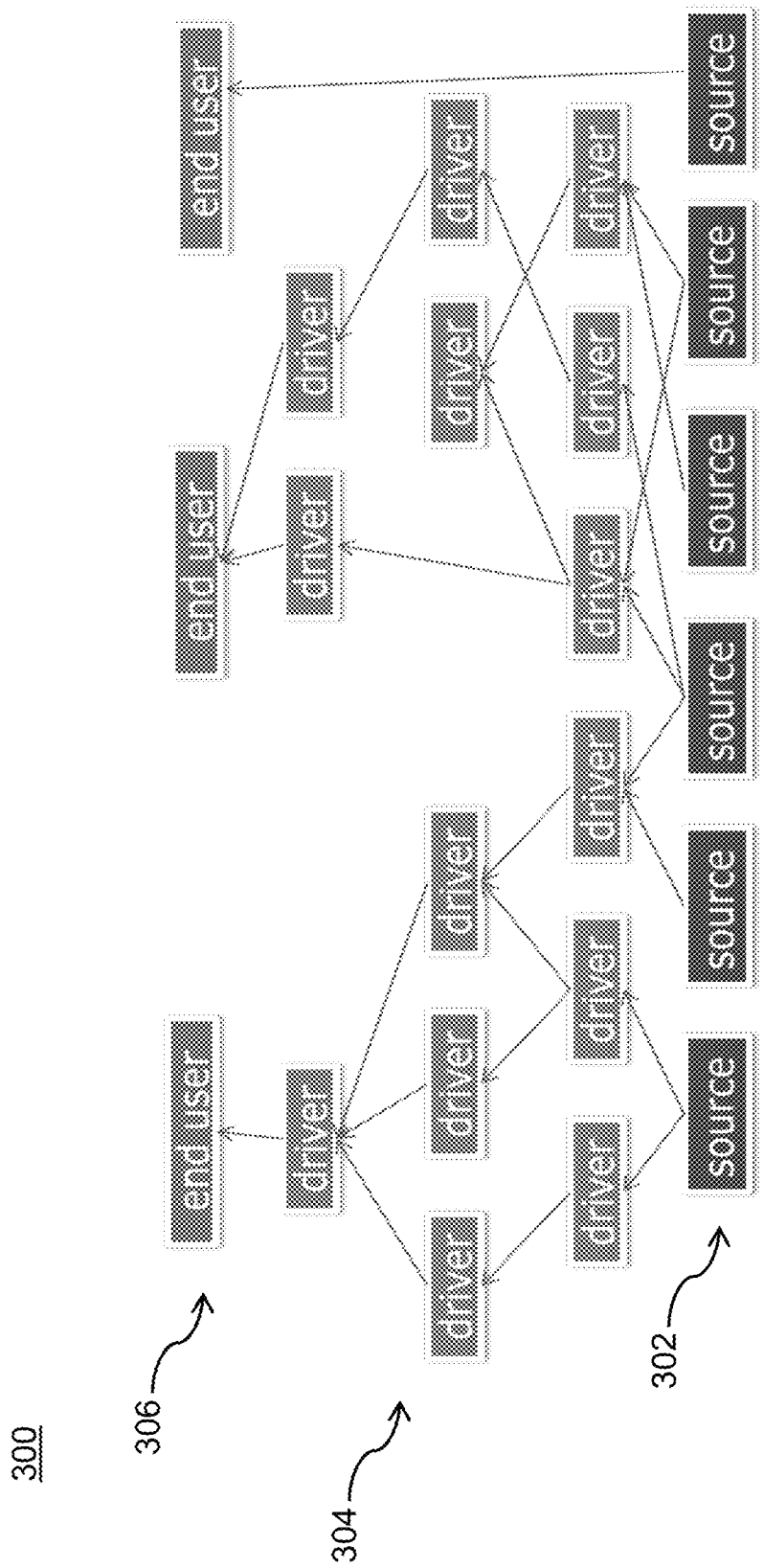
FIG. 3 illustrates a data asset lineage map, according to an embodiment of the invention.

FIG. 3 illustrates a data asset lineage map 300 according to an embodiment of the invention. In illustrative embodiments, the CDE manager 116 generates and maintains such a data asset lineage map 300. Alternatively, one or more other components of the data governance system 105, or one or more components outside the system, may generate and maintain the lineage map. As shown, data elements within the data lake are mapped into nodes of a hierarchical architecture. More particularly, data elements, such as the bottom-most level source elements 302 (or fields within those elements), are fed into and combined with other data elements to create either driver (intermediate) data elements 304 and/or end-user analytic results 306 (depicted in the top level).

Based on the data asset lineage map 300, the CDE manager 116 automatically associates each data element with a cardinality representing how often it is consumed and passed up to end-user results. As illustratively used herein, "cardinality" is the number of elements in a set or other grouping, as a property of that grouping.

A lineage map for data assets, such as lineage map 300, can be created in any number of ways. In one embodiment, the lineage is created by a combination of running nightly (periodic) scans of data assets in a data lake (by way of example only, a data processing product available from Attivio of Newton, Mass.) and running software that is aware of analytic assets that create driver and end user data assets (by way of example only, a data processing product available from Collibra of New York, N.Y.).

Thus, the lineage data is augmented by maintaining cardinality metadata that tracks attributes such as "number of end user nodes" and/or "number of connections to all nodes" (and/or any other cardinality criteria). As the cardinality metadata meets or crosses pre-defined thresholds (e.g., data asset is consumed by greater than 3 end-user assets), the data element can be flagged as critical, i.e., flagged by the CDE manager 116 as a CDE. The formula for cardinality-based thresholding can focus on the crossing of one threshold (e.g., end-user nodes), multiple thresholds (e.g., both end-user and all nodes), and/or an equation that takes into account multiple variables (e.g., addition of end user nodes and all nodes being greater than 10, by way of example, a source may have 2 end users and 11 total nodes giving it a cardinality value of 13).

The CDE manager 116 is also configured to flag derived CDEs. That is, the CDE manager 116 can also assign criticality to intermediate data elements (depicted as "driver" elements in lineage map 300 in FIG. 3). This provides an automated way to recognize critical data assets for those cases where a derived data set may go unrecognized by a data steward or SME.

In addition to flagging an asset as critical, the CDE manager 116 can attach additional metadata to the data element which describes the reasoning for flagging the data element as critical. FIG. 4 shows such a resulting data structure in the form of table 400 for a given source (source3) from the data asset lineage graph 300. In this illustrative embodiment, the rationale captured is represented as a table but can certainly be an alternative data structure such as, but not limited to, a database row, an XML file, etc.

The CDE manager 116 can implement rationale in such a way that it can watch fluctuating rationale over time (e.g., using timestamps and a linked list of rationales) and also prevent tampering (e.g., fingerprinting the rationale with a hash value). This automated historical and auditable functionality allows the CDE manager 116 to track interesting fluctuations which may actually cause the asset to become non-critical (e.g., data assets are pruned from a data lake). Alternatively, a CDE can be assumed to be "once critical, always critical" such that the CDE manager 116 does not reflag a data element as non-critical once it has been flagged as a CDE.

Illustrative embodiments also provide for the CDE manager 116 to augment cardinality with business relevance. For example, in addition to calculating the cardinality of a data element, the lineage chain can be walked to determine the degree to which a data element is relevant to different lines of business. There are a variety of ways to manage relevance using the lineage calculated by the data governance system 105.

One of the metadata attributes that is assigned to data elements in the data lake is whether or not the data is "customer-facing" i.e., dealing directly with a customer of the enterprise. In one embodiment, the metadata attribute is implemented as a flag (e.g., flag set to a logic I/O representing yes/no). This flag can be used by the CDE manager 116 as an additional data value to help determine criticality. For example, the CDE manager 116 can implement one or more of the following criteria: all data elements marked as customer-facing can be flagged as CDEs; all data elements that are an ancestor of a customer-facing data element can be marked as CDEs; and the cardinality of a data element can be doubled (or tripled) if it has a customer-facing data element in its lineage.

For example, the CDE manager 116 can determine that a given source is "more critical" than any other source data element because it contributes to a customer-facing data element.

Another approach to determining relevance is to calculate which lines of business are consuming a given data element, and/or how many lines of business are consuming the data element. Such additional metadata may be used by the CDE manager 116 to prioritize and classify CDEs.

Another automated algorithm that can be used by the CDE manager 116 to flag CDEs attempts to "match" data elements that are not necessarily connected via direct lineage but that could represent potential criticality to the enterprise.

By way of one example, offline (e.g., overnight), data assets are crawled and tokenized to identify indirect connections associated with data elements that could be important to the enterprise. These data elements are therefore marked as potential CDEs. In this way, the line of business relevance is advantageously increased by searching similar context and marking any such data elements as potential CDEs.

As an alternative (or in addition to) to table 400, in another embodiment, data elements identified by the CDE manager 116 as CDEs can be marked in the data asset lineage graph 300 itself using flags.

Given a system in which CDEs are constantly being identified, a cost-per-event entry can be generated for that element in the CDE cost per event matrix 118. Most fields will initially be set to a null value. However, it is possible to identify the business processes that the CDE maps to by navigating the data asset lineage graph 300 and discovering insights such as, but not limited to: data science teams that work with that data and the organizations they belong to; monitoring which business processes (e.g., applications) utilize that data; and other approaches that map data elements to business processes.

Figure 5:
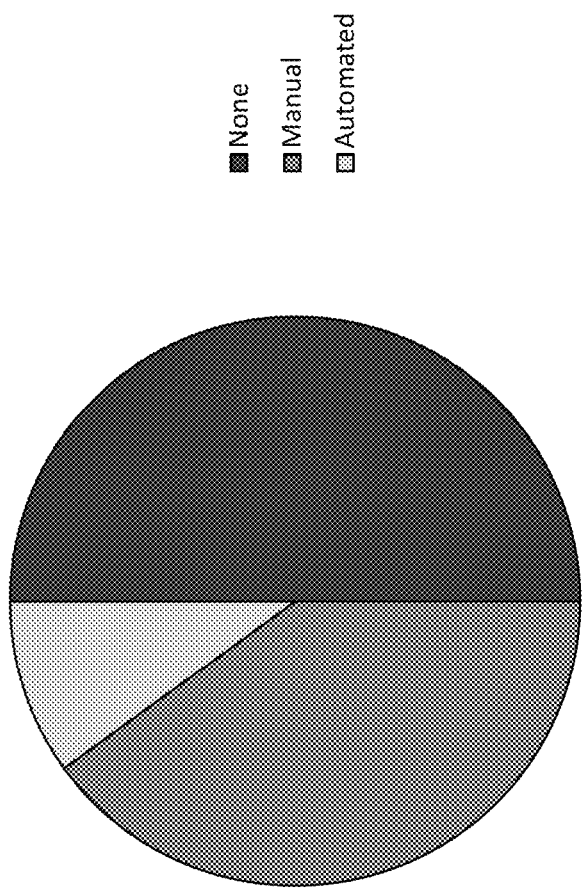
FIG. 5 illustrates a risk analysis visualization, according to an embodiment of the invention.

Furthermore, the creation of a data structure such as the CDE cost per event matrix allows a visualization of CDEs that have undergone some type of data risk financial assessment. FIG. 5 illustrates such a visualization 500, which can be created by the CDE manger 116 iterating through the matrix 118 and determining whether or not a CDE has been tagged as manually evaluated, automatically evaluated, or not evaluated at all. The visualization can be presented to a data scientist or to some other enterprise personnel through a graphical user interface directly attached to the data governance system 105 or otherwise accessible by a user device 102 over the network 104 (FIG. 1).

Visualization 500 in FIG. 5 illustrates that out of all the CDEs identified in the data governance system, half of them have had zero data/cost risk assessment performed, 40% have undergone some sort of manual assessment, and 10% can be calculated dynamically.

This type of visualization serves many purposes. For example, the visualization allows a data quality organization to quantify the amount of unknown financial risk that may be lurking within CDEs, and take steps to reduce that amount. Further, the visualization allows a data quality organization to convert manually-calculated CDEs to automatically-calculated CDEs.

Should a data quality issue result in a post-mortem analysis of the business impact, a user interface is available to the CDE cost per event matrix that allows for details about the post-mortem to be input as CDE metadata. In this case, all rows in the matrix could be tagged as "manual," and the administrator could also input any dependent "intake" fields that were used as part of the calculation.

If the data quality post-mortem was conducted, for example, by a data science team, this team could choose to preserve the analytic algorithms used to calculate the cost that was associated with the CDE. This preservation is useful because it can be continually run in the future (with fresher inputs) to monitor potential variations of the data element. For example, returning to FIG. 2, a pointer to a "SalesForecastScript( )" (column 210, row 218) may be entered for the "Revenue" business process of CDE "country_code". This analytic module accepts the country_code as input, combines HistoricalSales and Forecast data sets (column 208, row 218) with that country_code, and calculates a financial figure (column 206, row 218) describing how much revenue is dependent on that country_code value being correct.

The CDE cost per event matrix, being closely tied to the CDE identification ecosystem, can receive triggers whenever a new CDE is identified. This trigger causes the automatic population of the matrix for that new CDE, which in turn changes the percent of CDEs at risk in visualization in FIG. 5.

Over time, this may lead to a change in behavior in terms of the introduction of data elements into, for example, a data lake ecosystem. As new data sets are ingested and explored, they can be automatically linked to existing business processes, intake variables, and automation scripts via the matrix.

Figure 6:
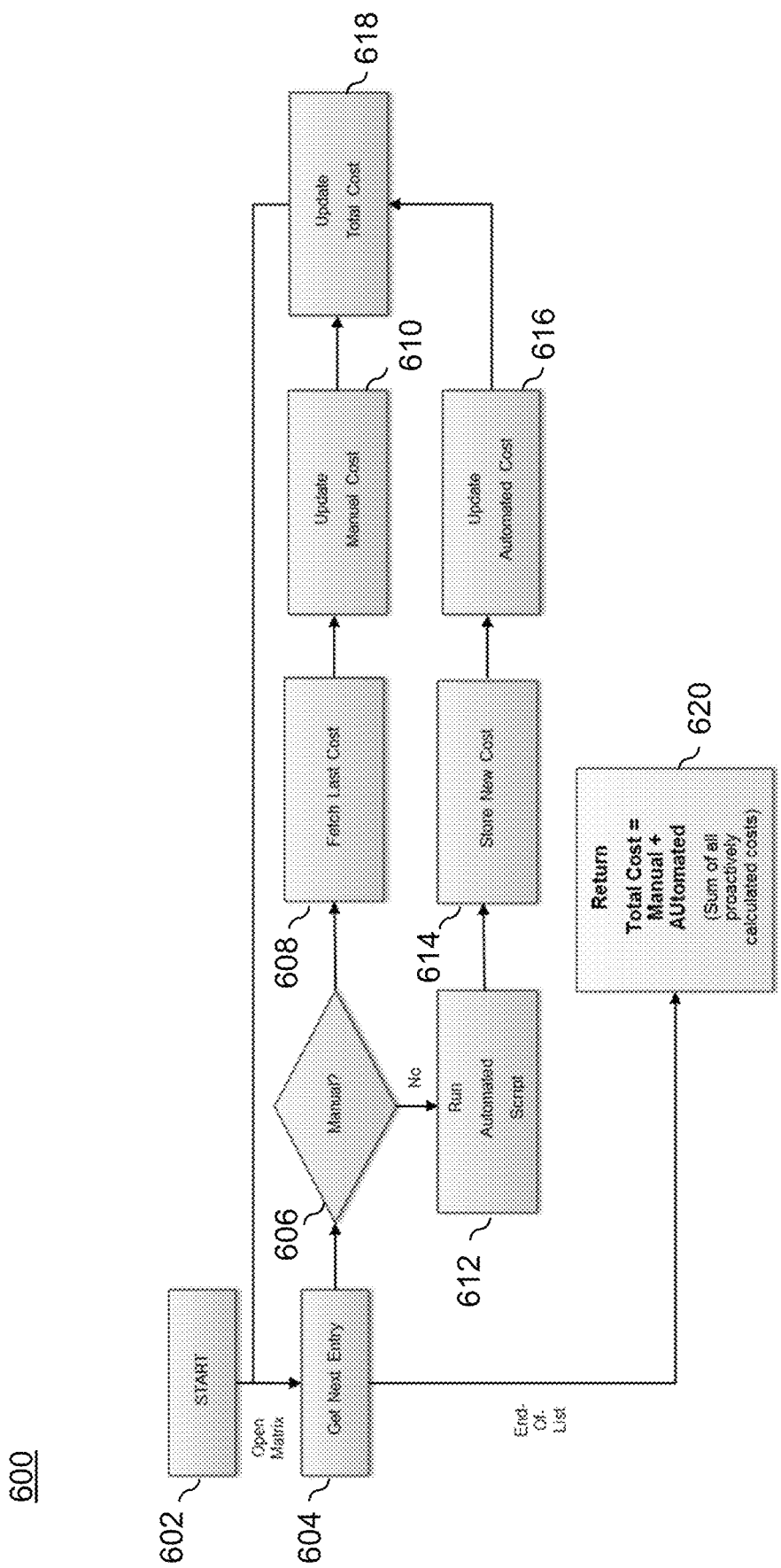
FIG. 6 illustrates a critical data element cost algorithm, according to an embodiment of the invention.

The implementation of a cost per event matrix allows for a continual (e.g. nightly, weekly) evaluation of CDE data risk costs. The flowchart in FIG. 6 illustrates an automated process for calculating the estimated data risk costs on a CDE basis as well as in total, according to an illustrative embodiment.

As shown, CDE cost algorithm 600 executed by CDE manager 116 starts at block 602. In step 604, a given CDE is retrieved. In step 606, it is determined whether or not a manual impact assessment has been performed for the retrieved CDE. If yes, then in step 608 the last impact cost that was determined is retrieved (this can be retrieved from matrix 118). Then, the manual cost is updated based on current inputs in step 610.

Returning to step 606, if a manual impact assessment was not done, then in step 612 an automated impact assessment script is executed. The new cost is stored (in matrix 118) in step 614, and can be updated in step 616 if new inputs are available.

In step 618, the updated manually-computed costs (610) and the updated automatically-computed costs (616) are combined and once again updated assuming new inputs are available.

Then, the process retrieves the next CDE (step 604) and the repeats the cost updates (steps 606 through 618).

In step 620, the process returns the total manual and automated cost calculations for all CDEs considered. This total value represents the sum of all proactively calculated costs for the enterprise to evaluate and take actions to minimize the risk of loss.

Triggers can be placed anywhere within process 600 to monitor a significant rise and/or fall in cost for a given CDE, as well as a significant rise or fall in the amount of manually generated cost estimates (which are likely to be stale). Advantageously, the risk valuation process 600, together with the cost per vent matrix 118, provides monitoring of the potential financial consequences for specific data quality events that may occur in a data-dependent organization.

With every business process impact in case of an event, there is a labor cost which includes the cost to root cause the data issue and impacted CDE, and the cost to fix the data once it has been identified. If the issue is not properly identified or fixed properly, it increases the risks and hence the costs. The process 600 of FIG. 6 can be augmented to also take into account the scope of data cleanup and conditioning, based on historical cleaning costs, current labor rates, and/or size/scope of the CDE. This labor cost can also factor in a diagnostic cost in terms of tracking how long it takes to identify and fix a data issue. If time-to-debug-and-identify is logged into the cost per event matrix after data quality issues are found/fixed, this debug cost can also be added to the matrix.

Further, in one or more embodiments, the CDE manager 116 uses the CDEs as identifiers to identify the applications associated with them. These could be associated by the CDE manager 116 looking at the data drivers and source (e.g., using a lineage map such as the example in FIG. 3). The risk of losing an application means a data creation process is halted and, hence, there is a business impact which could be quantified.

Also, in one or more embodiments, when many CDEs are aggregated to an application, the CDE manager 116 is configured not only to establish the cost of data but also the application and in turn business impact/cost as well. This embodiment provides a bottom up approach.

Still further, the CDE manager 116 is configured in one or more embodiments with the ability to flexibly add any risk algorithms to the process of cost estimation. For example, risk prediction can be performed by one or more dynamically selected risk assessment algorithms, i.e., a risk algorithm suitable for the particular circumstances can be selected by the CDE manger 116.

The operation of the system 100 will now be described in further detail with reference to the flow diagram of FIG. 7. The process 700 as shown includes steps 702, 704 and 706, and is suitable for use in the system 100 but is more generally applicable to other types of information processing systems.

In step 702, the process identifies one or more data elements associated with an enterprise as one or more critical data elements.

In step 704, the process maintains a data structure for the one or more critical data elements, wherein for a given critical data element, the data structure stores information that reflects an impact that the given critical data element had on at least one event associated with the enterprise.

In step 706, the process predicts a risk associated with a subsequent impact that the given critical data element may have on at least one subsequent event associated with the enterprise, wherein the risk of the subsequent impact is predicted using at least a portion of the information stored in the data structure.

Figure 7:
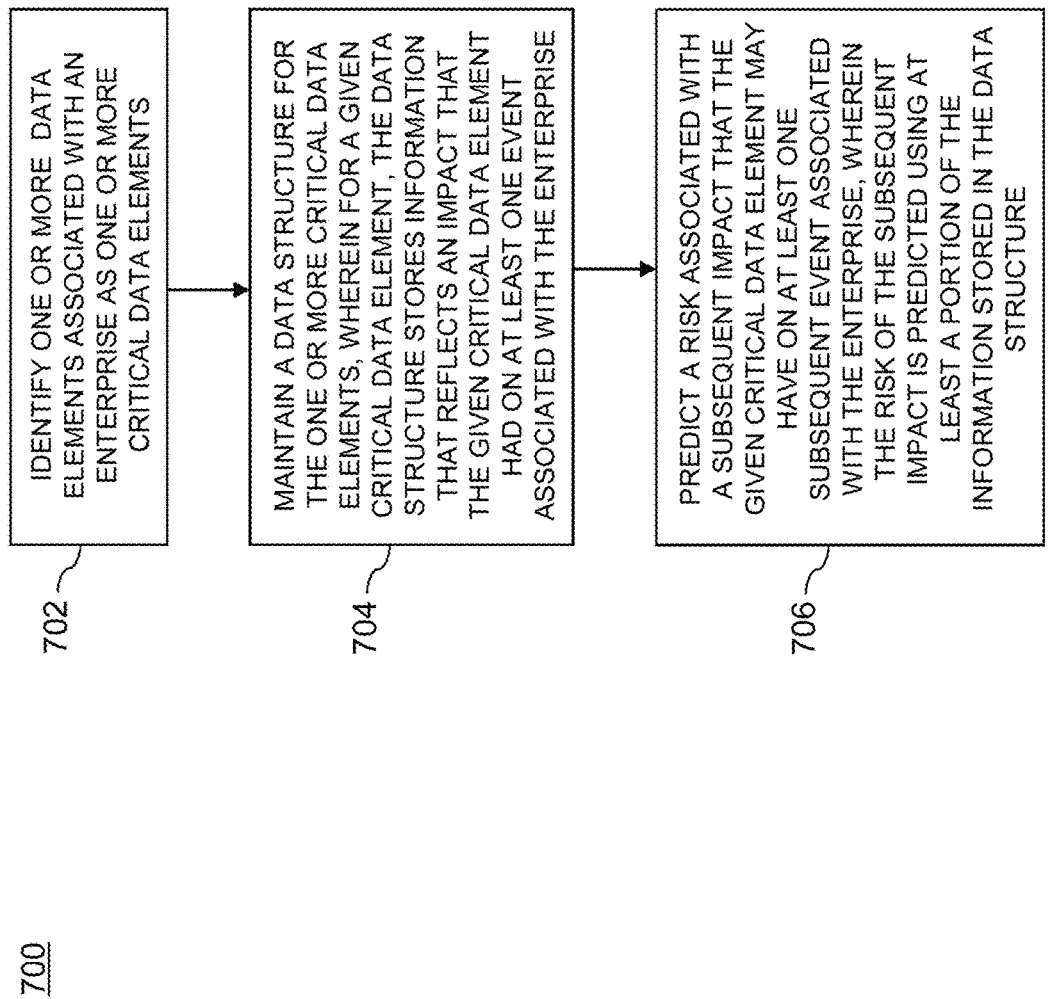
FIG. 7 illustrates a risk valuation-based data governance methodology, according to an embodiment of the invention.

The particular processing operations and other system functionality described in conjunction with the flow diagrams of FIGS. 6 and 7 are presented by way of illustrative example only, and should not be construed as limiting the scope of the invention in any way. Alternative embodiments can use other types of processing operations for implementing risk valuation data governance functionality. For example, the ordering of the process steps may be varied in other embodiments, or certain steps may be performed concurrently with one another rather than serially. Also, one or more of the process steps may be repeated periodically for providing governance functionality for different sets of enterprise data assets from respective different sets of data sources, or multiple instances of the process can be performed in parallel with one another for such different sets of enterprise data assets.

It is to be appreciated that functionality such as that described in conjunction with the flow diagrams of FIGS. 6 and 7 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

As mentioned previously, at least portions of the information processing system 100 may be implemented using one or more processing platforms. Illustrative embodiments of such platforms will now be described in greater detail in conjunction with FIGS. 8 and 9. Although described primarily in the context of information processing system 100, these platforms may also be used to implement at least portions of other information processing systems in other embodiments of the invention.

Figure 8:
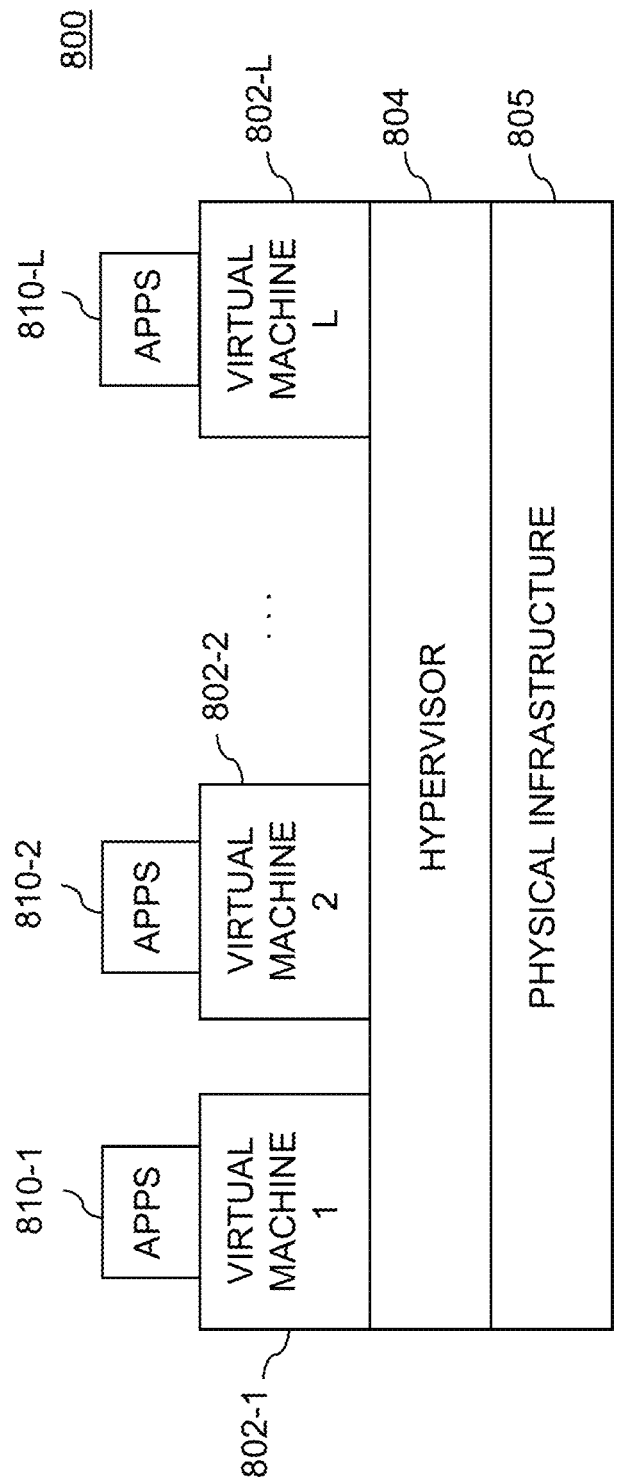
FIGS. 8 and 9 show examples of processing platforms that may be utilized to implement at least a portion of an information processing system in illustrative embodiments.
Figure 9:
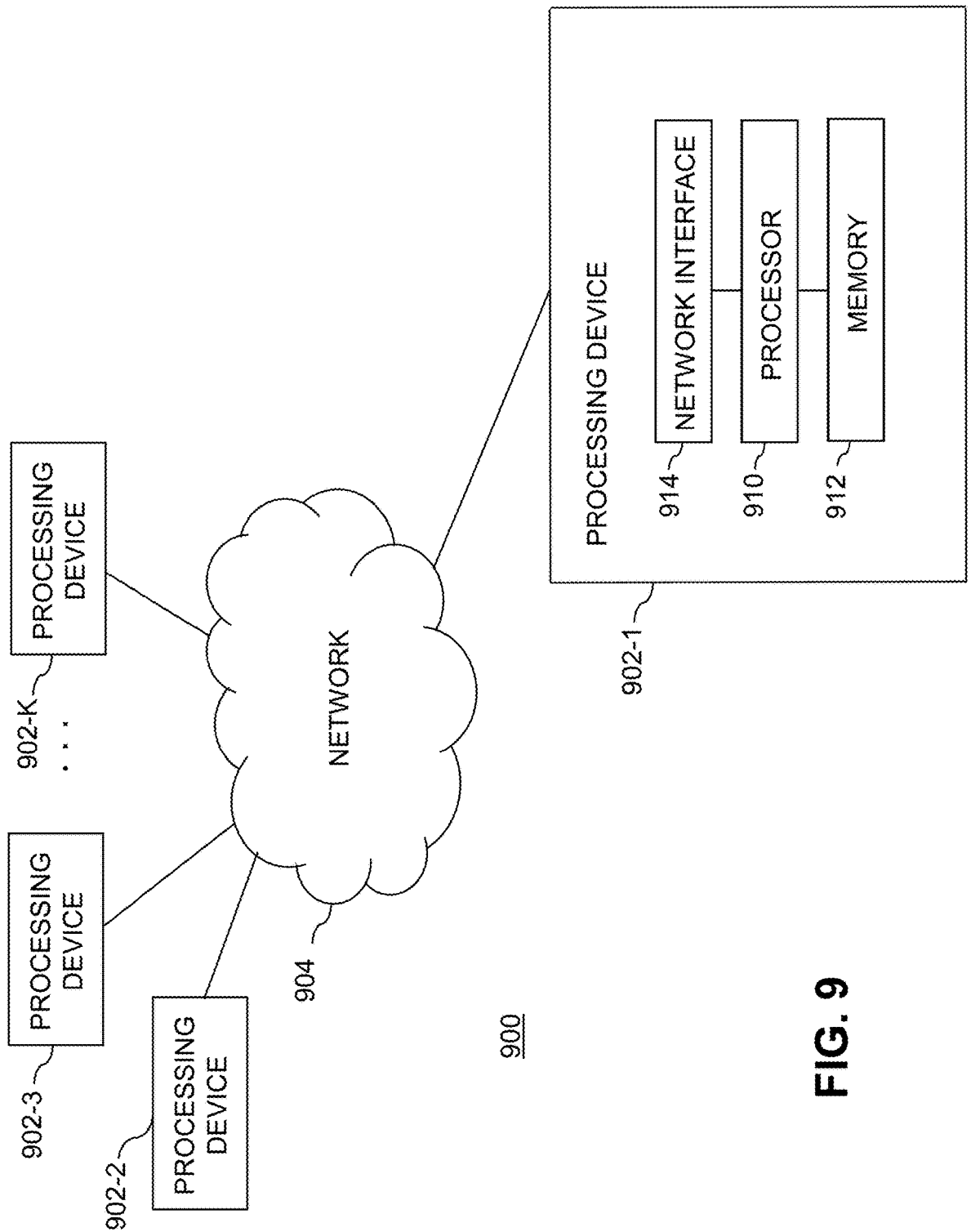

FIG. 8 shows an example processing platform comprising cloud infrastructure 800. The cloud infrastructure 800 comprises a combination of physical and virtual processing resources that may be utilized to implement at least a portion of the information processing system 100. The cloud infrastructure 800 comprises virtual machines (VMs) 802-1, 802-2, . . . 802-L implemented using a hypervisor 804. The hypervisor 804 runs on physical infrastructure 805. The cloud infrastructure 800 further comprises sets of applications 810-1, 810-2, . . . 810-L running on respective ones of the virtual machines 802-1, 802-2, . . . 802-L under the control of the hypervisor 804.

These and other types of cloud infrastructure can be used to implement one or more system components, such as data governance system 105, analytics platform 120, or combinations or portions thereof, in a given embodiment.

Although only a single hypervisor 804 is shown in the embodiment of FIG. 8, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 804 and possibly other portions of the information processing system 100 in one or more embodiments of the invention is the VMware® vSphere® which may have an associated virtual infrastructure management system such as the VMware® vCenter™. The underlying physical machines may comprise one or more distributed processing platforms that include one or more storage systems.

Such storage systems can comprise any of a variety of different types of storage including network-attached storage (NAS), storage area networks (SANs), direct-attached storage (DAS) and distributed DAS, as well as combinations of these and other storage types, including software-defined storage.

Particular types of storage products that can be used in implementing a given storage system in an illustrative embodiment include VNX® and Symmetrix VMAX® storage arrays, software-defined storage products such as ScaleIO™ and ViPR®, flash-based storage arrays such as DSSD™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators in the S-Series, X-Series and NL-Series product lines, all from Dell EMC Corporation. Combinations of multiple ones of these and other storage products can also be used in implementing a given storage system in an illustrative embodiment.

More specifically, some embodiments can comprise a storage system implemented using DAS configurations comprising local hard drives in respective servers. Such a storage system may additionally or alternatively comprise specialized high-performance flash storage such as DSSD™ accessible via PCIe connections. Numerous other configurations are possible for a given storage system or other related components of the system 100.

As is apparent from the above, one or more of the processing modules or other components of system 100 may each run on a computer, server, storage device or other processing platform element. A given such element may be viewed as an example of what is more generally referred to herein as a "processing device." The cloud infrastructure 800 shown in FIG. 8 may represent at least a portion of one processing platform. Another example of such a processing platform is processing platform 900 shown in FIG. 9.

The processing platform 900 in this embodiment comprises a portion of system 100 and includes a plurality of processing devices, denoted 902-1, 902-2, 902-3, . . . 902-K, which communicate with one another over a network 904.

The network 904 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

As mentioned previously, some networks utilized in a given embodiment may comprise high-speed local networks in which associated processing devices communicate with one another utilizing PCIe cards of those devices, and networking protocols such as InfiniBand, Gigabit Ethernet or Fibre Channel.

The processing device 902-1 in the processing platform 900 comprises a processor 910 coupled to a memory 912.

The processor 910 may comprise a microprocessor, a microcontroller, an application-specific integrated circuit (ASIC), a field-programmable gate array (FPGA) or other type of processing circuitry, as well as portions or combinations of such circuitry elements.

The memory 912 may comprise random access memory (RAM), read-only memory (ROM) or other types of memory, in any combination. The memory 912 and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

For example, other processing platforms used to implement embodiments of the invention can comprise different types of virtualization infrastructure, in place of or in addition to virtualization infrastructure comprising virtual machines. Such virtualization infrastructure illustratively includes container-based virtualization infrastructure configured to provide Docker containers or other types of Linux containers (LXCs).

The containers may be associated with respective tenants of a multi-tenant environment of the system 100, although in other embodiments a given tenant can have multiple containers. The containers may be utilized to implement a variety of different types of functionality within the system 100. For example, containers can be used to implement respective cloud compute nodes or cloud storage nodes of a cloud computing and storage system. The compute nodes or storage nodes may be associated with respective cloud tenants of a multi-tenant environment of system 100. Containers may be used in combination with other virtualization infrastructure such as virtual machines implemented using a hypervisor.

As another example, portions of a given processing platform in some embodiments can comprise converged infrastructure such as VxRail™, VxRack™ or Vblock® converged infrastructure commercially available from VCE, the Virtual Computing Environment Company, a Dell EMC Federation Company. For example, portions of a value-based governance system of the type disclosed herein can be implemented utilizing converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of a data asset governance controller, CDE manager, CDE cost per event matrix, data asset catalog, technical metadata hub, business metadata hub or other component of a hierarchical value-based governance system are illustratively implemented in one or more embodiments the form of software running on a processing platform comprising one or more processing devices.

It should again be emphasized that the above-described embodiments of the invention are presented for purposes of illustration only. Many variations and other alternative embodiments may be used. For example, the disclosed techniques are applicable to a wide variety of other types of information processing systems, data governance systems, analytics platforms, analytics workspaces and other components. Also, the particular configurations of system and device elements, associated processing operations and other data governance functionality illustrated in the drawings can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
identifying one or more data elements associated with an enterprise as one or more critical data elements;
maintaining a data structure for the one or more critical data elements, wherein for a given critical data element, the data structure stores information that reflects an impact that the given critical data element had on at least one event associated with the enterprise;
predicting a risk associated with a subsequent impact that the given critical data element may have on at least one subsequent event associated with the enterprise, wherein the risk of the subsequent impact is predicted using at least a portion of the information stored in the data structure; and
performing an impact assessment for the given critical data element in the data structure;
wherein the impact assessment is based at least in part on an aggregate of a manual impact cost assessment and an automated impact cost assessment of the given critical data element on the at least one subsequent event;
wherein the data structure further comprises, for the given critical data element, a plurality of fields uniquely identifying respective enterprise processes that leverage the given critical data element;
wherein the data structure further comprises, for the given critical data element, a plurality of fields containing respective values representing previous impacts that the given critical data element respectively had on the respective enterprise processes; and
wherein the identifying, maintaining, predicting and performing steps are implemented by one or more processing devices each comprising a processor coupled to a memory.

2. The method of claim 1, wherein the data structure further comprises, for the given critical data element, a plurality of fields that identify respective inputs that were used to compute the values representing previous impacts.

3. The method of claim 2, wherein, for the given critical data element, the inputs comprise one or more other critical data elements.

4. The method of claim 2, wherein the data structure further comprises, for the given critical data element, a plurality of fields that identify analytics used to compute the values representing previous impacts based on the inputs.

5. The method of claim 1, further comprising generating a visualization representing a metric of risk assessment for the one or more critical data elements in the data structure, the metric of risk assessment reflecting the number of critical data elements in the data structure that have undergone a risk analysis versus the number of critical data elements in the data structure that have not undergone a risk analysis.

6. The method of claim 1, wherein the data structure maintaining step further comprises, for the given critical data element, automatically and manually updating the information stored in the data structure, the updated information utilized in determining the impact assessment.

7. The method of claim 1, wherein a given critical data element is associated with a given application such that the data structure also reflects an impact on the given application.

8. The method of claim 1, wherein the data structure maintaining step further comprises automatically adding entries for one or more additional critical data elements to the data structure as the one or more additional critical data elements are identified; and
wherein predicting the risk associated with the subsequent impact is continually performed as updated information is received and analytics are executed.

9. The method of claim 1, wherein, for the given critical data element, the data structure maintains information representing one or more of: a cost to determine a root cause of an issue associated with the given critical data element; and a cost to address the issue associated with the given critical data element, the information being used in performing the impact assessment.

10. The method of claim 9, wherein the issue associated with the given critical data element comprises a data quality issue.

11. The method of claim 1, wherein the performing an impact assessment step is performed at least in part by one or more dynamically selected risk assessment algorithms.

12. The method of claim 1, including performing an impact assessment for a plurality of select given critical data elements, and further including determining a total impact assessment for the select given critical data elements.

13. The method of claim 1 wherein the data structure is dynamically populated with information based on a data lineage graph dynamically maintained for the enterprise, the data lineage graph identifying one or more relationships of the given critical data element with one or more other critical data elements.

14. The method of claim 1 wherein the given critical data element is a single data element.

15. A computer program product comprising a non-transitory processor-readable storage medium having stored therein program code of one or more software programs, wherein the program code when executed by at least one processing device causes said at least one processing device to:
identify one or more data elements associated with an enterprise as one or more critical data elements;
maintain a data structure for the one or more critical data elements, wherein for a given critical data element, the data structure stores information that reflects an impact that the given critical data element had on at least one event associated with the enterprise;
predict a risk associated with a subsequent impact that the given critical data element may have on at least one subsequent event associated with the enterprise, wherein the risk of the subsequent impact is predicted using at least a portion of the information stored in the data structure; and
perform an impact assessment for the given critical data element in the data structure;
wherein the impact assessment is based at least in part on an aggregate of a manual impact cost assessment and an automated impact cost assessment of the given critical data element on the at least one subsequent event;
wherein the data structure further comprises, for the given critical data element, a plurality of fields uniquely identifying respective enterprise processes that leverage the given critical data element; and
wherein the data structure further comprises, for the given critical data element, a plurality of fields containing respective values representing previous impacts that the given critical data element respectively had on the respective enterprise processes.

16. The computer program product of claim 15, wherein the program code is configured to:
automatically and manually update the information stored in the data structure, the updated information utilized in performing the impact assessment.

17. The computer program product of claim 15 wherein the given critical data element is a single data element.

18. An apparatus comprising:
at least one processing platform accessible to a plurality of user devices over at least one network;
wherein the processing platform implements a critical element manager for data assets of an enterprise, and wherein the critical data element manager is configured to:
identify one or more data elements associated with an enterprise as one or more critical data elements;
maintain a data structure for the one or more critical data elements, wherein for a given critical data element, the data structure stores information that reflects an impact that the given critical data element had on at least one event associated with the enterprise;
predict a risk associated with a subsequent impact that the given critical data element may have on at least one subsequent event associated with the enterprise, wherein the risk of the subsequent impact is predicted using at least a portion of the information stored in the data structure; and
perform an impact assessment for the given critical data element in the data structure;
wherein the impact assessment is based at least in part on an aggregate of a manual impact cost assessment and an automated impact cost assessment of the given critical data element on the at least one subsequent event;
wherein the data structure further comprises, for the given critical data element, a plurality of fields uniquely identifying respective enterprise processes that leverage the given critical data element; and
wherein the data structure further comprises, for the given critical data element, a plurality of fields containing respective values representing previous impacts that the given critical data element respectively had on the respective enterprise processes.

19. The apparatus of claim 18, wherein the critical data element manager is configured to:
automatically and manually update the information stored in the data structure, the updated information utilized in performing the impact assessment.

20. The apparatus of claim 18 wherein the given critical data element is a single data element.

* * * * *